US011897092B2

(12) United States Patent
Hsieh

(10) Patent No.: US 11,897,092 B2
(45) Date of Patent: Feb. 13, 2024

(54) COVER PLATE STRUCTURE OF RATCHET WRENCH

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 0 days.

(21) Appl. No.: 17/701,130

(22) Filed: Mar. 22, 2022

(65) Prior Publication Data

US 2022/0212319 A1 Jul. 7, 2022

Related U.S. Application Data

(63) Continuation-in-part of application No. 16/819,064, filed on Mar. 14, 2020, now abandoned.

(51) Int. Cl.
*B25B 13/46* (2006.01)
*B25B 23/00* (2006.01)

(52) U.S. Cl.
CPC ........ *B25B 13/463* (2013.01); *B25B 23/0035* (2013.01)

(58) Field of Classification Search
CPC .......................... B25B 13/463; B25B 13/0035
USPC ........................................................... 81/63.2
See application file for complete search history.

(56) References Cited

U.S. PATENT DOCUMENTS

| | | | | |
|---|---|---|---|---|
| 5,157,994 A * | 10/1992 | Krivec | B25B 13/463 | 81/63 |
| 6,260,448 B1 * | 7/2001 | Chaconas | B25B 23/0035 | 81/63 |
| 6,655,237 B2 * | 12/2003 | Chen | B25B 13/461 | 81/60 |
| 2018/0222020 A1 * | 8/2018 | Yang | B25B 13/463 | |

* cited by examiner

*Primary Examiner* — Hadi Shakeri

(57) ABSTRACT

The present invention provides a cover plate structure of ratchet wrench comprising: a main body, inside a head portion thereof has an accommodating space, a peripheral wall is formed in the accommodating space, and the accommodating space is formed with at least one opening; a ratchet mechanism provided in the accommodating space; a cover plate having a cover portion and a snap-abut portion, the cover plate is placed in the opening of the accommodating space, and the snap-abut portion is stuck against the peripheral wall of the accommodating space. an elastic fastener member is disposed between the head portion and the cover plate, the fastener member applies an elastic force to the cover plate, so that the snap-abut portion of the cover plate elastically snaps against the peripheral wall of the accommodating space. The cover plate is capable of bearing the load during operation, increasing the withstand strength of the head portion.

7 Claims, 5 Drawing Sheets

COVER PLATE STRUCTURE OF RATCHET WRENCH

This application is a Continuation-In-Part of application Ser. No. 16/819,064, entitled COVER PLATE STRUCTURE OF RATCHET WRENCH, filed on Mar. 14, 2020.

BACKGROUND OF THE INVENTION

Field of Invention

The present invention relates to a hand tool, and more particularly to a cover plate structure of ratchet wrench capable of increasing the strength of bearing a force.

Related Art

The conventional ratchet wrench mainly uses a ratchet mechanism to apply unidirectional force to drive a workpiece, and the direction of force being applied can be changed by changing the direction of operation. For example, the prior art ratchet wrench described in the Taiwan utility model patent M576088 has a main body, a chamber is provided in a head portion of the main body, and inside the chamber is provided with a ratchet mechanism; and a cover plate is fixedly screwed on the main body with two bolts, so that the ratchet mechanism can be accommodated in the chamber.

Since bolts are required for fixedly screwing the cover plate of the conventional ratchet wrench on the main body, the main body needs to be provided with screw holes near by the chamber, so that the cover plate can be fixedly screwed over the chamber, which relatively increases the volume of the main body; and since the cover plate can only be placed on the main body, the cover plate is incapable of bearing the force applied to the main body caused by the load generated by the ratchet mechanism during operation, and therefore the strength of the head portion to bear a force cannot be increased, and the overall strength of the ratchet wrench to withstand force cannot be increased.

SUMMARY OF THE INVENTION

A main object of the present invention is to provide a cover plate structure of ratchet wrench capable of increasing the strength.

In order to achieve the above object, the present invention provides a cover plate structure of ratchet wrench comprising:

- a main body having a head portion and a shaft, the head portion is provided at a front end of the shaft, the head portion has an accommodating space therein, a peripheral wall is formed at a rear end of the accommodating space, and the accommodating space is formed with at least one opening located at a top surface or a bottom surface of the head portion; a front end of the opening of the accommodating space is provided with a slot;
- a ratchet mechanism provided in the accommodating space and having a drive portion;
- a cover plate having a cover portion and a snap-abut portion, a thickness of the snap-abut portion is larger than a thickness of the cover portion, the cover plate is placed in the opening of the accommodating space, the cover portion is provided with a through hole corresponding to the drive portion of the ratchet mechanism, and the snap-abut portion is snapped and abutted against the peripheral wall of the accommodating space; and
- an elastic fastener member having a c-shaped ring body, the outer diameter of the ring body can be elastically reduced or expanded, the ring body having two terminals, an open end of the fastener member being formed between the two terminals, and an end of the ring body opposite to the open end being a closed end; the fastener member being installed in the accommodating space, disposed between the head portion and the cover plate, the terminals being inserted into the slot and elastically snapped against a peripheral surface of the slot, and the closed end of the fastener member contacting a front end of the snap-abut portion of the cover plate, the fastener member applying an elastic force to push the cover plate to move toward a rear side of the accommodating space, the snap-abut portion of the cover plate elastically snapping against the peripheral wall of the accommodating space.

In this way, when the cover plate is placed in the opening of the accommodating space of the main body, the snap-abut portion is capable of abutting on the peripheral wall of the accommodating space, so that the snap-abut portion is capable of partially bearing a force borne by the main body, Thereby, force that can be borne by the ratchet wrench is increased, the load bearing strength of the accommodating space can be improved, and the service life can be extended.

BRIEF DESCRIPTION OF THE DRAWINGS

The objects, features and efficacies of the present invention can be understood from the description of the following preferred embodiment.

DETAILED DESCRIPTION OF THE INVENTION

Figure 1:
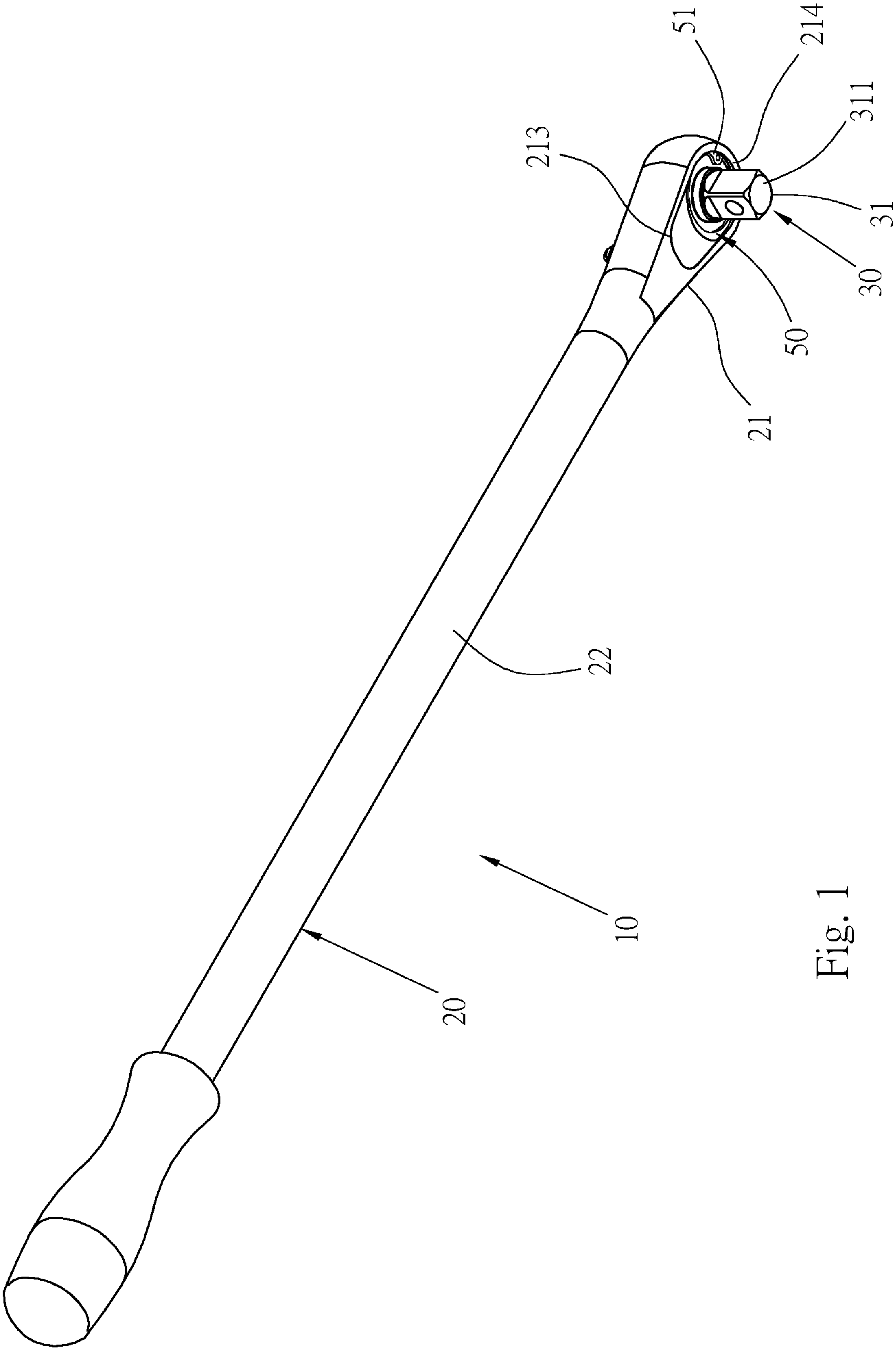
FIG. 1 is a perspective view of a preferred embodiment of the present invention.

Please refer to FIGS. 1 to 4, which are a cover plate structure of ratchet wrench provided by a preferred embodiment of the present invention. A ratchet wrench 10 mainly includes a main body 20, a ratchet mechanism 30, a cover plate 40, and a fixing element 50.

The main body 20 has a head portion 21 and a shaft 22, the head portion 21 is disposed at a front end of the shaft 22, and a bottom surface of the head portion 21 is recessed with an accommodating space 211. The accommodating space 211 is formed with an opening 212 at the bottom surface of the head portion 21, a peripheral wall 213 is formed inside the accommodating space 211, a front end of the opening 212 is provided with an arcuate slot 214, and the peripheral wall 213 is provided at a rear end of the accommodating space 211 near the shaft 22. A shoulder 215 is formed in the accommodating space 211. There is a distance H1 between an end surface of the shoulder 215 and the opening 212. A top of the accommodating space 211 is communicated with a connection hole 216. The accommodating space 211 can also pass through a top surface and the bottom surface of the head portion 21.

The ratchet mechanism 30 is disposed in the accommodating space 211, and includes a ratchet 31, a ratchet tooth 32, and a reversing button 33. A drive portion 311 is provided on the ratchet 31, and a positioning stud 331 is protruded from a bottom end of the reversing button 33. When being installed, the reversing button 33 is inserted into the accommodating space 211 from a top end of the connection hole 216, and the ratchet tooth 32 and the ratchet 31 are sequentially inserted into the accommodating space 211 from the opening 212, so that the ratchet tooth 32 is disposed between the ratchet 31 and the reversing button 33. The structure and operation mode of the ratchet mechanism 30 are known structure, which will not be additional described here.

Figure 3B:
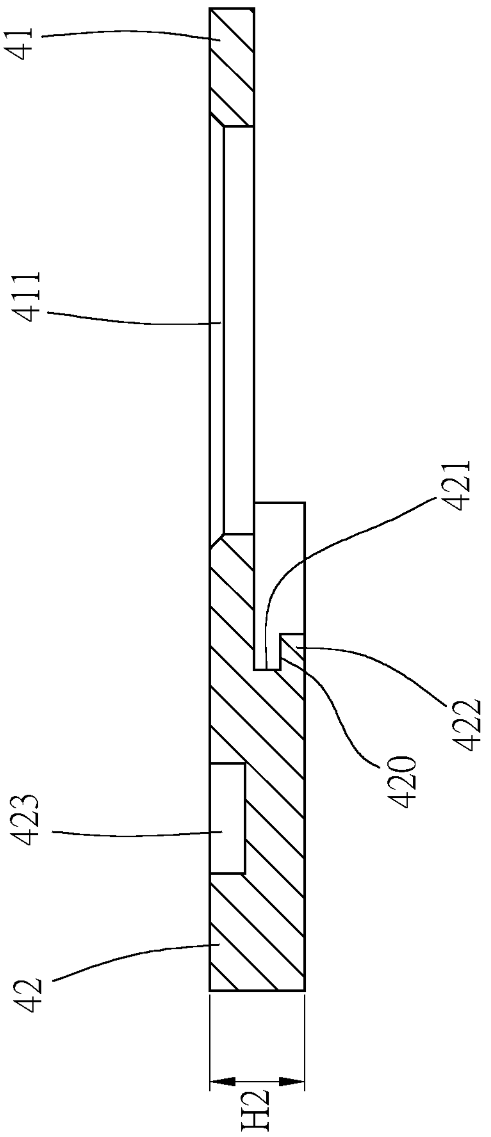
FIG. 3B is a cross-sectional view of the cover plate of the present invention.
Figure 3A:
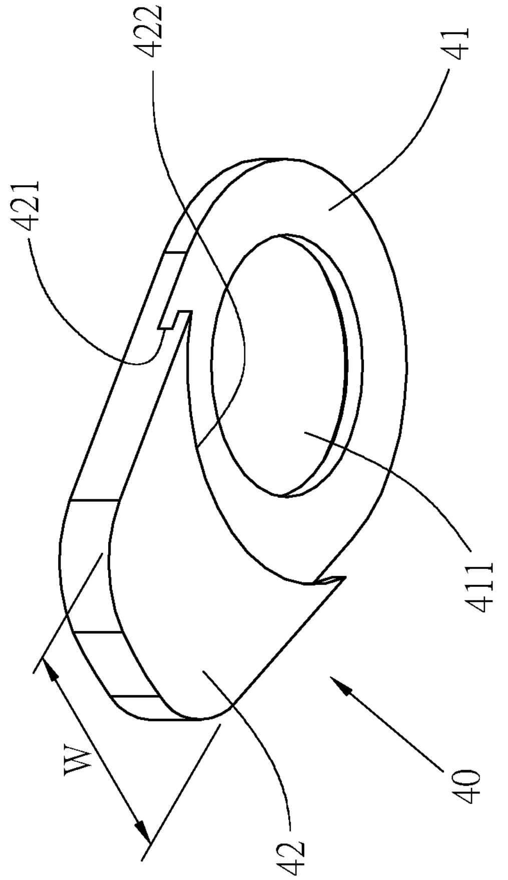
FIG. 3A is a perspective view of a cover plate of the present invention.

Please refer to FIGS. 3A and 3B. The cover plate 40 has a cover portion 41 and a snap-abut portion 42. The cover plate 40 covers the opening 212 of the accommodating space 211 and is located at the end of the shoulder 215 of the accommodating space 211. The cover portion 41 is provided with a through hole 411 for the drive portion 311 of the ratchet 31 to pass through. A thickness H2 of the snap-abut portion 42 is greater than a thickness of the cover portion 41, and the thickness H2 of the snap-abut portion 42 is equivalent to the distance H1 between the opening 212 and the shoulder 215, so that when the cover plate 40 covers the opening 212, the snap-abut portion 42 is flush with a bottom surface of the main body 20, and the snap-abut portion 42 is in contact with the peripheral wall 213 of the accommodating space 211. A front end of the snap-abut portion 42 of the cover plate 40 nears the cover portion 41 of the cover plate 40, a groove 420 is formed at the front end of the snap-abut portion 42, a peripheral surface of the groove 420 forms an arcuate connecting surface 421. The snap-abut portion 42 is provided with a flange 422 protruding from a bottom end of the arcuate connecting surface 421. In addition, a top surface of the snap-abut portion 42 in contact with the accommodating space 211 is provided with a positioning hole 423, and the positioning hole 423 is used to insert and limit the positioning stud 331 of the reversing button 33 therein, the reversing button 33 is more stability when it is rotating.

The fixing element 50 is an elastic fastener member 51, such as a C-shaped retaining ring capable of producing the effect of elastic snap and restraint. The fastener 51 has a c-shaped ring body 52. The ring body 52 has two terminals 53, an open end 54 of the fastener member 51 is formed between the two terminals 53, and an end of the ring body 52 opposite to the open end 54 is a closed end 56. The outer diameter of the ring body 52 can be elastically retracted inwardly and expanded outwardly. When the ring body 52 is compressed, the outer diameter of the ring body is reduced, and the two terminals 53 move close to each other. When the compression force is released, the outer diameter of the ring body 52 expands elastically, the terminals 53 are far away from each other, the original state of the ring body 52 is restored. The fixing element 50 is elastically snapped between the slot 214 of the head portion 21 and the arcuate connecting surface 421 of the cover plate 40, so that the cover plate 40 can be snapped over the opening 212 of the accommodating space 211, and the fastener member 51 is capable of elastically pushing the snap-abut portion 42 of the cover plate 40 to press tightly toward the peripheral wall 213 of the accommodating space 211. Please refer to FIG. 5, the contour of the peripheral wall 213 is matched with the contour of the snap-abut portion 42. The configuration of the peripheral wall 213 and the snap-abut portion 42 are tapered, and the width W of the peripheral wall 213 and the snap-abut portion 42 decreases from a front side to a rear side thereof.

Figure 2:
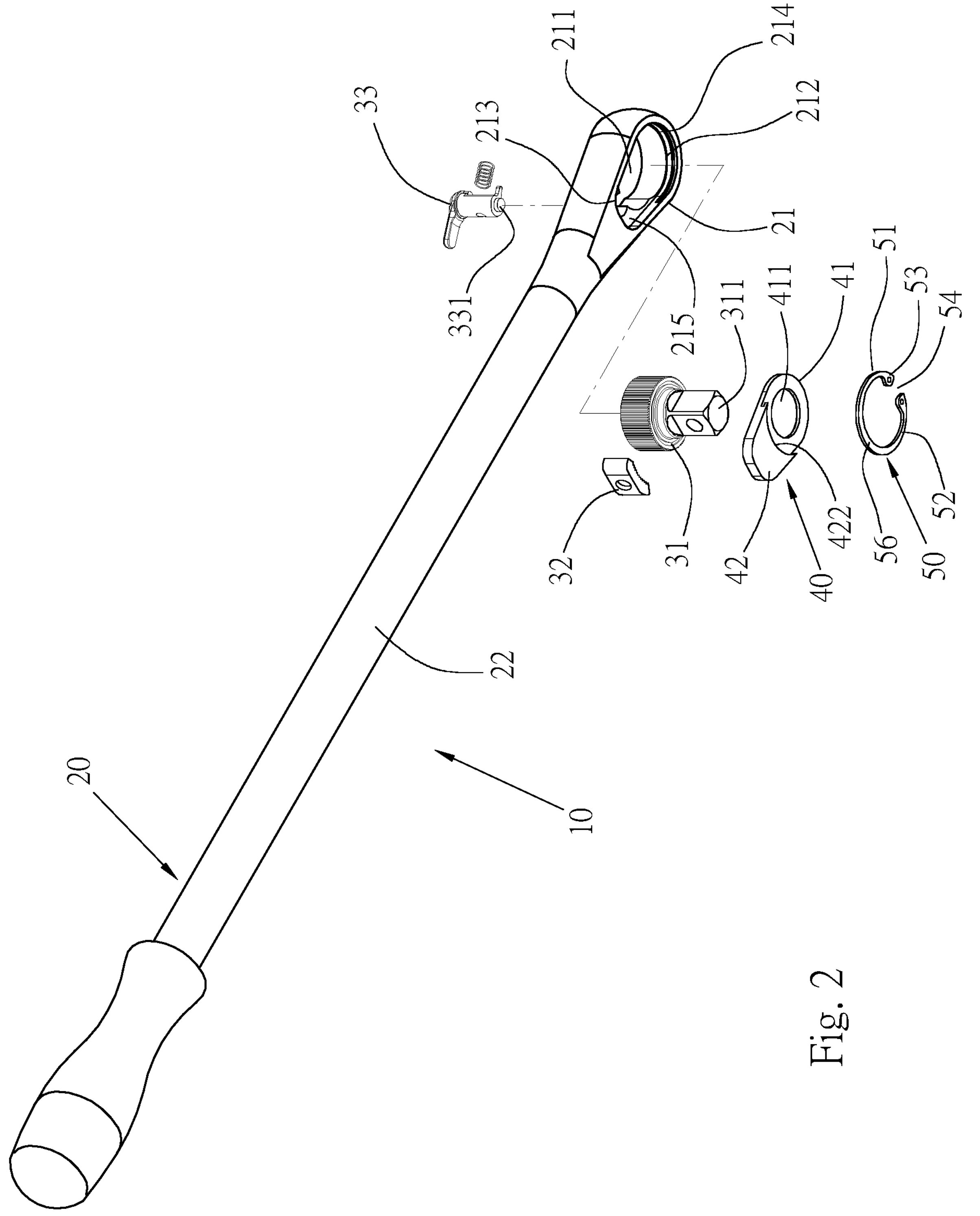
FIG. 2 is an exploded perspective view of FIG. 1.
Figure 4:
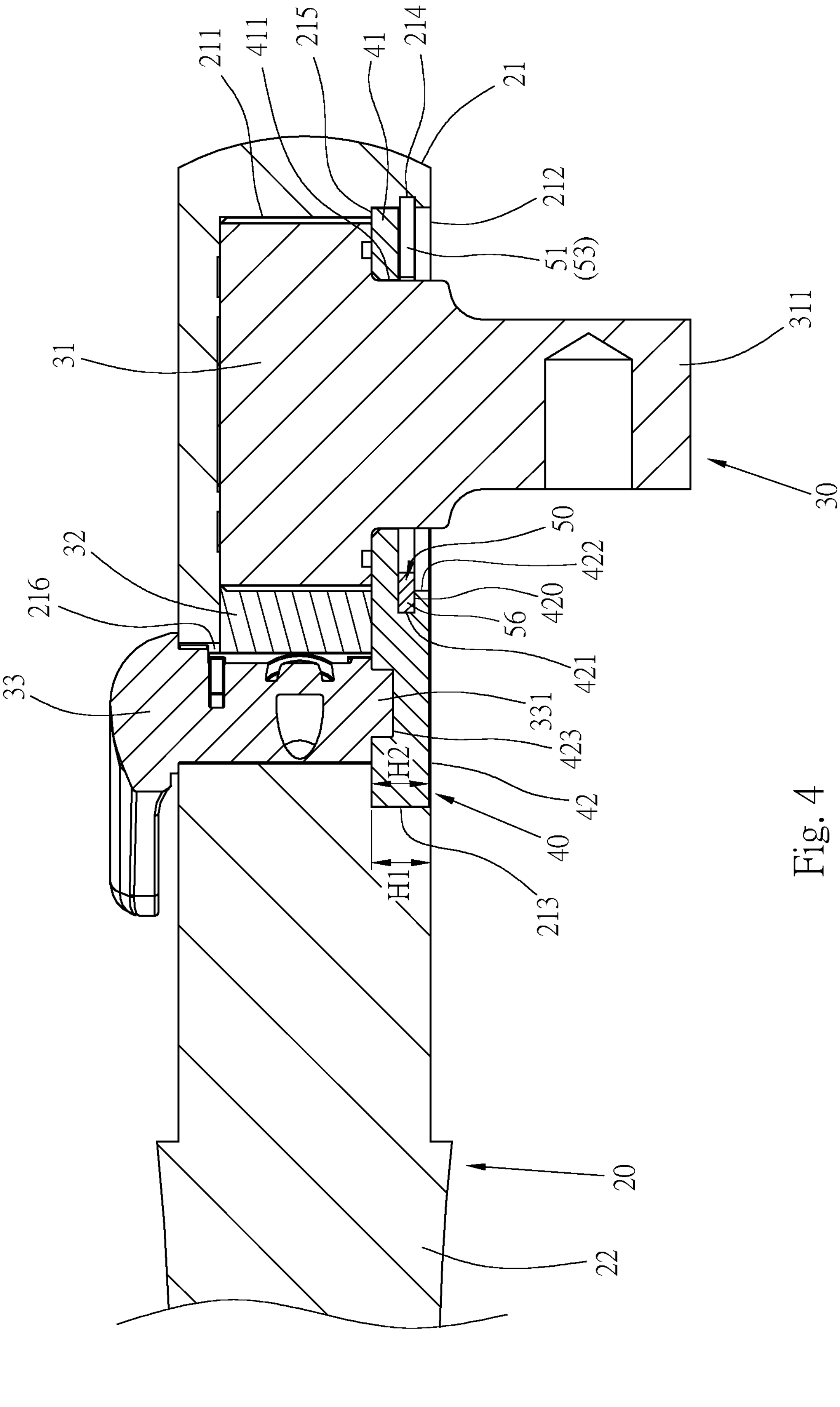
FIG. 4 is a partial cross-sectional view of FIG. 1.

Please refer to FIGS. 2 and 4. When being installed, the reversing button 33 of the ratchet mechanism 30 is firstly inserted into the accommodating space 211 through the connection hole 216 at a top of the main body 20, and then the ratchet tooth 32 is inserted into the accommodating space 211 from the opening 212 of the head portion 21, so that the ratchet tooth 32 is located in front of the reversing button 33. Then the ratchet 31 is inserted into the accommodating space 211 from the opening 212, so that the reversing button 33 is capable of changing the direction of the ratchet tooth 32, and the ratchet 31 is capable of driving the drive portion 311 unidirectionally in order to drive a workpiece.

Figure 5:
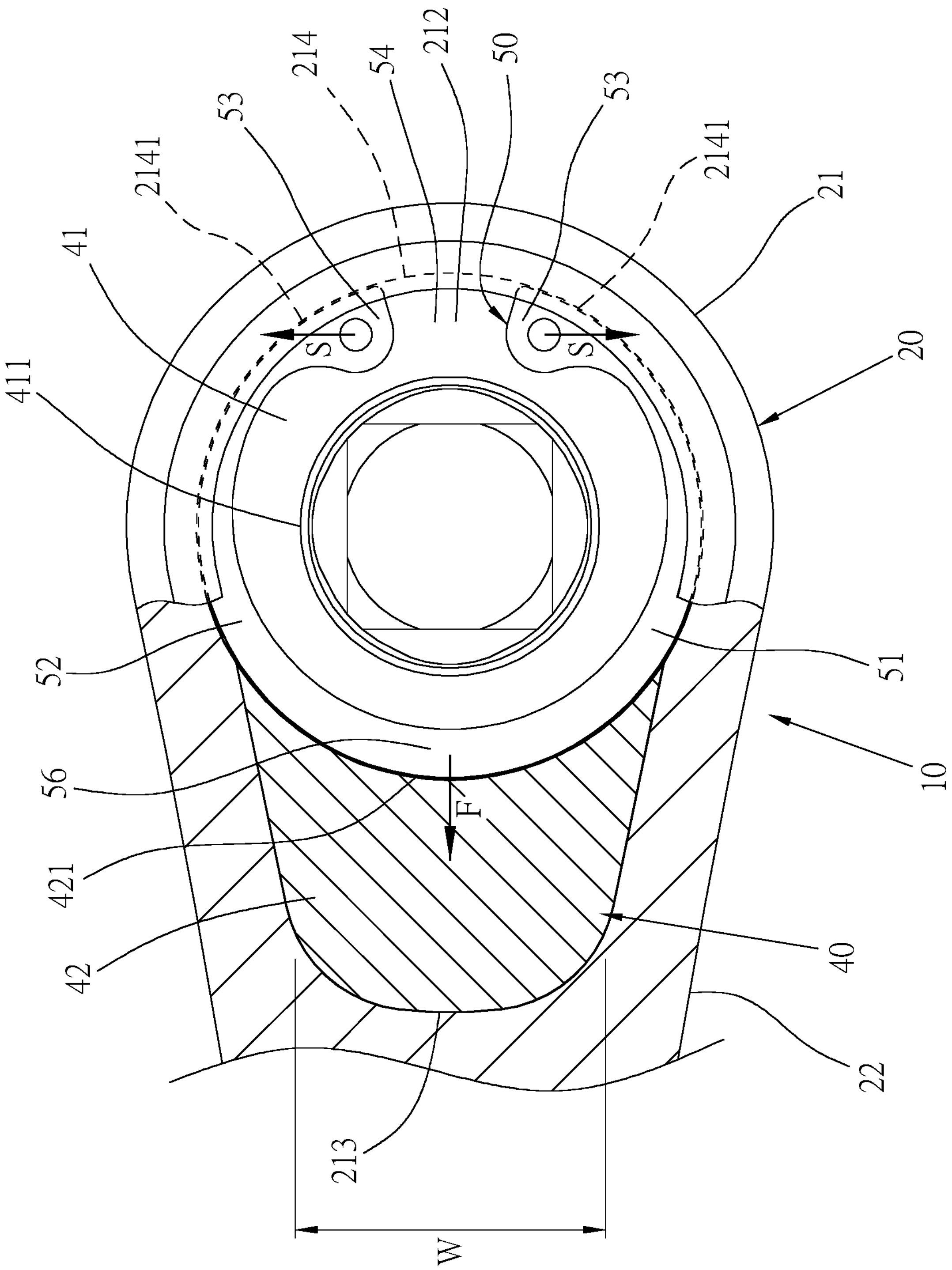
FIG. 5 is a bottom view of a snap-abut portion of the cover plate of FIG. 1 connected to a peripheral wall of a head portion.

Please refer to FIGS. 4 and 5. After the ratchet mechanism 30 is assembled in the accommodating space 211, the cover plate 40 is inserted in the accommodating space 211 through the opening 212, and the cover plate 40 is placed to be positioned on a bottom of the shoulder 215, and a bottom surface of the snap-abut portion 42 is flush with the bottom surface of the main body 20, so that it is smoother overall when the cover plate 40 is assembled with the main body 20. Then, the fastener member 51 is firstly contracted by applying a compressing force to reduce the outer diameter of the ring body 52, and the fastener member 51 is inserted through the opening 212 of the main body 20 with the open end 54 of the fastener member 51 is located at a front end of the opening 212, away from the cover plate 40, and the closed end 56 of the fastener member 51 faces the snap-abut portion 42 of the cover plate 40. Then, the elastic buckle 51 is released from the compressing force, so that the ring body 52 of the fastener member 51 generates elastic restoring force and stretches outward. The open end 54 of the fastener member 51 is inserted into and elastically snapped against the slot 214 of the head portion 21 and the closed end 56 of the fastener member 51 is inserted into the groove 420 of the cover plate 40 and contacts the arcuate connecting surface 421 of the cover plate 40, so that the cover plate 40 can be elastically snapped inside the accommodating space 211. The installation of the ratchet mechanism 30 and the cover plate 40 is completed.

Please refer to FIG. 5, after the fastener member 51 is inserted into the slot 214 and the groove 420, the two terminal ends 53 of the fastener member 51 elastically expand outward in the S direction and contact the peripheral surface 2141 of the slot 214, while the closed end 56 of the fastener member 51 contacts the arcuate connecting surface 421 of the cover 40. Since the peripheral surface 2141 of the slot 214 is inclined, when the two terminals 53 expand outward and contact the peripheral surface 2141 of the slot 214, the fastener member is urged to move backward (which means to move toward the rear side of the accommodating space 211), and the closed end 56 of the fastener 51 provides a backward elastic force F on the arcuate connecting surface 421 to pushes the cover plate 40 backward, that is, toward the rear side of the accommodating space 211, so that the snap-abut portion 42 of the cover plate 40 is kept elastically pressed on the peripheral wall 213 tightly and attached to the peripheral wall 233, and the snap-abut portion 42 supports the accommodating space 211. In this way, when the shaft 22 of the main body 20 exerts a force to drive the ratchet mechanism 30, force borne by the head portion 21 of the main body 20 is partially transmitted to the snap-abut portion 42, and therefore the load bearing strength of the accommodating space 211 of the main body 20 can be increased through the cover plate 40, so that deformation due to bearing excessive force will not easily occur to the accommodating space 211.

In addition, since the fastener member 51 couples the main body 20 with the cover plate 40 in an elastic snap manner, there is no need to additionally provide screw holes. Compared with the traditional fixing method, the overall volume can be reduced; at the same time, it does not need to be fixed by locking with screws, which can relatively reduce the assembling time and increase the production speed.

According to the ratchet wrench of the present invention, by having the cover plate stuck against the peripheral wall of the main body with the elastic force of the fastener member 51, force borne by the main body is transmitted to the cover plate, which strengthens the strength of the accommodating space, so as to increase the overall strength of the head portion and avoid damage, and thus can extend the service life. Compared with the conventional cover plate, which is only locked on the main body and the strength to bear a force cannot be increased, the cover plate of the present invention is capable of relatively increasing the load bearing strength of the head portion of the ratchet wrench, and reducing the space required for disposing the screw holes and the assembling time of screwing.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. A ratchet wrench comprising:

a main body having a head portion and a shaft, the head portion being provided at a front end of the shaft, the head portion having an accommodating space therein, a peripheral wall being formed at a rear end of the accommodating space, and the accommodating space being formed with at least one opening located at a top surface or a bottom surface of the head portion;

a front end of the opening of the accommodating space is provided with a slot;

a ratchet mechanism provided in the accommodating space and having a drive portion, wherein the ratchet mechanism includes a ratchet, a ratchet tooth and a reversing button;

a cover plate having a cover portion and a snap-abut portion, a thickness of the snap-abut portion being larger than a thickness of the cover portion, the cover plate being placed in the opening of the accommodating space, the cover portion being provided with a through hole corresponding to the drive portion of the ratchet mechanism, and the snap-abut portion being located in the peripheral wall of the accommodating space; and an elastic fastener member having a c-shaped ring body, the outer diameter of the ring body can be elastically reduced or expanded, the ring body having two terminals, an open end of the fastener member being formed between the two terminals, and an end of the ring body opposite to the open end being a closed end; the fastener member being installed in the accommodating space, disposed between the head portion and the cover plate, the terminals being inserted into the slot and elastically snapped against a peripheral surface of the slot, and the closed end of the fastener member contacting a front end of the snap-abut portion of the cover plate, the fastener member applying an elastic force to push the cover plate to move toward a rear side of the accommodating space, the snap-abut portion of the cover plate elastically snapping against the peripheral wall of the accommodating space;

wherein the cover plate is provided with a positioning hole at a surface of the snap-abut portion in contact with the accommodating space, a positioning stud is disposed at an end of the reversing button, and the positioning stud is inserted in the positioning hole;

an arcuate connecting surface is formed at the front end of the snap-abut portion of the cover plate, wherein the snap-abut portion is provided with a flange protruding from a bottom end of the arcuate connecting surface forming a groove between the flange and the cover portion; and wherein the cover plate is inserted through the opening at a bottom of the accommodating space.

2. The ratchet wrench as claimed in claim 1, wherein the closed end of the fastener member elastically contacts the arcuate connecting surface.

3. The ratchet wrench as claimed in claim 2, wherein the arcuate connecting surface is formed in the groove.

4. The ratchet wrench as claimed in claim 1, wherein a shoulder is protrudingly disposed in the accommodating space, and the cover plate is placed on the shoulder.

5. The ratchet wrench as claimed in claim 4, wherein a distance between an end surface of the shoulder and the opening is equivalent to a thickness of the snap-abut portion of the cover plate, so that when the cover plate is placed on the shoulder, the snap-abut portion is levelled with the main body.

6. The ratchet wrench as claimed in claim 1, wherein a top of the accommodating space is communicated with a connection hole, the reversing button is inserted into the accommodating space from the connection hole, the drive portion is provided on the ratchet, the drive portion of the ratchet corresponds to the through hole of the cover portion of the cover plate, and the ratchet tooth is disposed between the ratchet and the reversing button.

7. The ratchet wrench as claimed in claim 1, wherein the configuration of the peripheral wall of the accommodating space and the snap-abut portion of the cover plate are tapered, the width of the peripheral wall and the snap-abut portion decreases from a front side to a rear side.

* * * * *